(12) United States Patent
Takasaki et al.

(10) Patent No.: US 7,033,303 B2
(45) Date of Patent: Apr. 25, 2006

(54) TRANSFER DRIVE MODE SWITCHING CONTROL SYSTEM

(75) Inventors: Toshiharu Takasaki, Kanagawa (JP); Osamu Sugitani, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 176 days.

(21) Appl. No.: 10/828,244

(22) Filed: Apr. 21, 2004

(65) Prior Publication Data

US 2004/0214688 A1 Oct. 28, 2004

(30) Foreign Application Priority Data

Apr. 22, 2003 (JP) ............................. 2003-116490

(51) Int. Cl.
*F16H 59/68* (2006.01)
(52) U.S. Cl. .................. 477/97; 477/125; 477/906; 475/199
(58) Field of Classification Search .................. 477/97, 477/125, 906; 475/199
See application file for complete search history.

(56) References Cited

U.S. PATENT DOCUMENTS

| | | | | |
|---|---|---|---|---|
| 5,334,116 A | * | 8/1994 | Baxter, Jr. .................. | 475/204 |
| 5,584,776 A | * | 12/1996 | Weilant et al. .............. | 475/213 |
| 6,846,262 B1 | * | 1/2005 | Williams et al. ............ | 475/204 |

FOREIGN PATENT DOCUMENTS

| | | | | |
|---|---|---|---|---|
| JP | 63-17118 | * | 1/1988 | ................. 180/247 |
| JP | 2001-280491 A | | 10/2001 | |

\* cited by examiner

*Primary Examiner*—Ha Ho
(74) *Attorney, Agent, or Firm*—Foley & Lardner LLP

(57) ABSTRACT

In a transfer drive mode switching control system employing a shift actuator that switches from one of a plurality of drive mode positions of a transfer to the other, a drive mode position sensor is provided to detect the drive mode position switched by the shift actuator and to generate information regarding the drive mode position. A transfer control unit outputs a control command signal based on the drive mode position information to the shift actuator for controlling switching between the drive mode positions responsively to a driver-selected drive mode. The transfer control unit allows only a switching operation between predetermined two different drive mode positions corresponding to both ends of a working range of the shift actuator at which motion of the shift actuator is stopped mechanically, in presence of a failure in the drive mode position sensor.

12 Claims, 7 Drawing Sheets

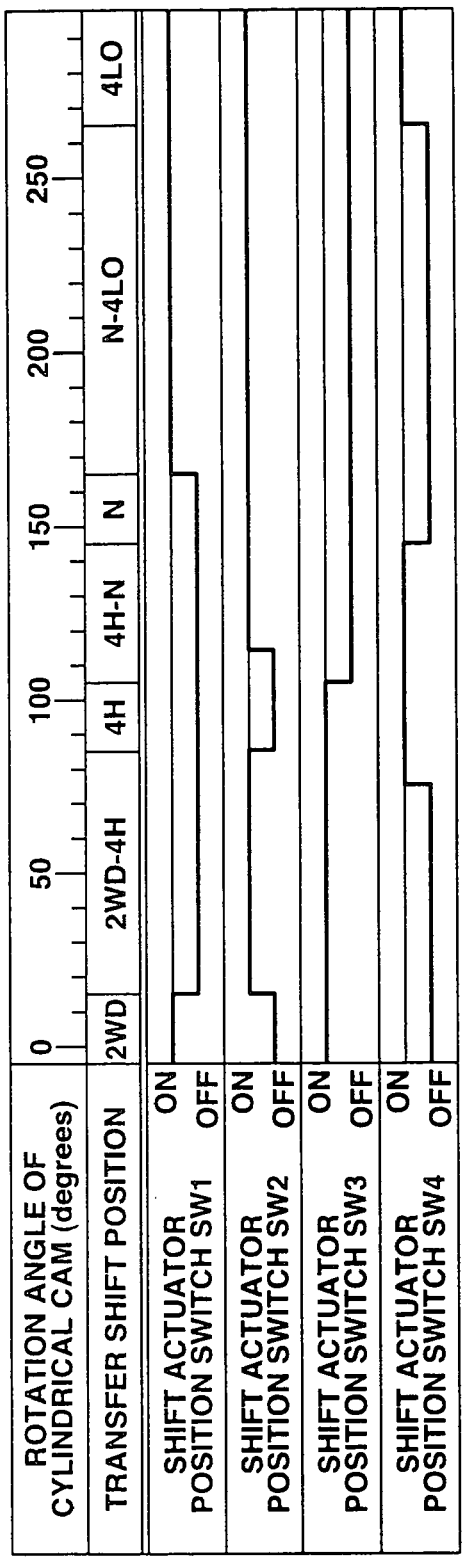

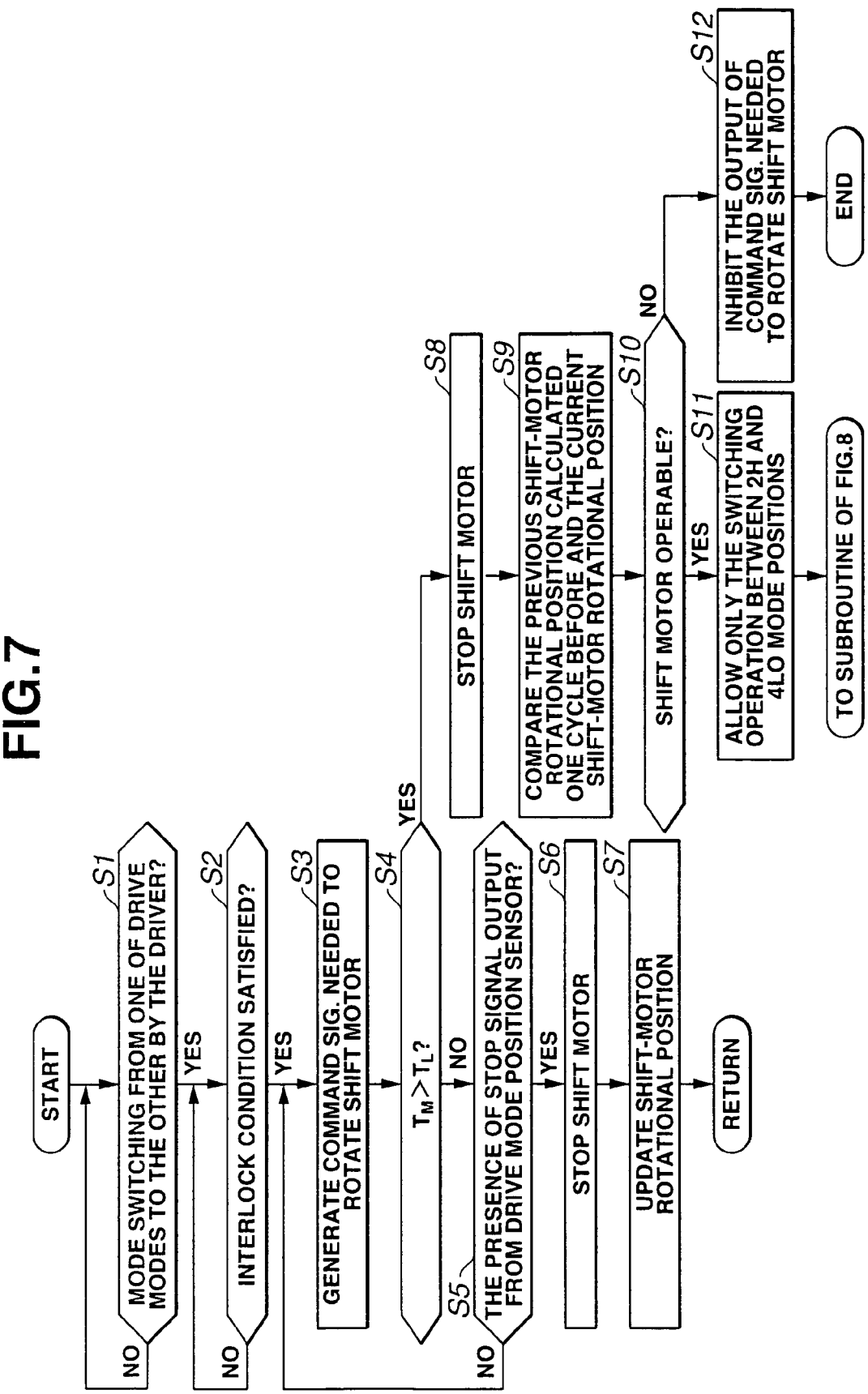

TRANSFER DRIVE MODE SWITCHING CONTROL SYSTEM

TECHNICAL FIELD

The present invention relates to a transfer-device drive mode switching control system capable of controlling a switching operation from one of at least three drive modes to the other via a shift motor in presence of a manual drive-mode shift by the driver, and specifically to the improvement of a fail-safe technology under partially failed transfer-device drive mode switching control system conditions, such as a drive mode position sensor failure or a shift motor failure.

BACKGROUND ART

In recent years, there have been proposed and developed various transfer drive mode switching control technologies. A transfer drive mode switching control system capable of providing a fail-safe function and a self-diagnosis function under partially failed transfer drive mode switching control system conditions, has been disclosed in Japanese Patent Provisional Publication No. 2001-280491 (hereinafter is referred to as "JP2001-280491"). The main purpose of the drive mode switching control system of the transfer device disclosed in JP2001-280491, is to prevent an automotive vehicle from being conditioned in an undrivable state occurring due to a shift motor kept in a neutral (N) position under partially failed transfer drive mode switching control system conditions, in particular, a drive mode position sensor failure. Actually, the transfer-device drive mode switching control system of JP2001-280491 allows switching to a drive mode position except the N position by activating the shift motor, but inhibits switching to neutral, if the drive mode position sensor is failed. Thereafter, the shift motor remains deactivated and stopped.

SUMMARY OF THE INVENTION

As discussed above, in the transfer-device drive mode switching control system as disclosed in JP2001-280491, the shift motor is continuously maintained in the deactivated state after the fail-safe function has been engaged and completed in presence of the drive mode position sensor failure, to inhibit or prevent subsequent executions of the drive mode switching operation. Assuming that the transfer is in the two-wheel-drive mode after the fail-safe function has been engaged and completed in presence of the drive mode position sensor system failure and then activation of the shift motor has been inhibited, it is impossible to switch from the two-wheel-drive (2WD) mode to the four-wheel-drive (4WD) mode even in presence of a driver's demand of switching to the 4WD mode. On the contrary, assuming that the transfer is in the 4WD mode after the fail-safe function has been engaged and completed in presence of the drive mode position sensor system failure and then activation of the shift motor has been inhibited, it is impossible to switch from the 4WD mode to the 2WD mode even in presence of a driver's demand of switching to the 2WD mode. That is, the fail-safe system of the transfer device as disclosed in JP2001-280491 cannot satisfactorily respond to a driver's drive mode switching requirement.

Accordingly, it is an object of the invention to provide a transfer drive mode switching control system, capable of allowing switching between two different drive modes (e.g., 2WD and 4WD modes) responsively to a driver's mode switching requirement even in presence of a failure in a drive mode position sensor system, while preventing an automotive vehicle from being conditioned in an undrivable state.

In order to accomplish the aforementioned and other objects of the present invention, a transfer drive mode switching control system comprises a shift actuator that switches from one of a plurality of drive mode positions of a transfer to the other, a drive mode position sensor that detects the drive mode position switched by the shift actuator and generates information regarding the drive mode position, a transfer control unit configured to be electrically connected to the drive mode position sensor and the shift actuator for outputting a control command signal based on the drive mode position information to the shift actuator and for controlling switching between the drive mode positions responsively to a driver-selected drive mode, and the transfer control unit allowing only a switching operation between predetermined two different drive mode positions corresponding to both ends of a working range of the shift actuator at which motion of the shift actuator is stopped mechanically, in presence of a failure in the drive mode position sensor.

According to another aspect of the invention, a transfer drive mode switching control system comprises a shift actuator for switching from one of a plurality of drive mode positions of a transfer to the other, drive mode position detection means for detecting the drive mode position switched by the shift actuator and for generating information regarding the drive mode position, drive mode switching control means configured to be electrically connected to the drive mode position detection means and the shift actuator for outputting a control command signal based on the drive mode position information to the shift actuator and for controlling switching between the drive mode positions responsively to a driver-selected drive mode, and the drive mode switching control means allowing only a switching operation between predetermined two different drive mode positions corresponding to both ends of a working range of the shift actuator at which motion of the shift actuator is stopped mechanically, in presence of a failure in the drive mode position detection means.

According to a still further aspect of the invention, a method for controlling switching from one of a plurality of drive mode positions of a transfer to the other via a shift actuator responsively to a driver-selected drive mode, the method comprises detecting the drive mode position switched by the shift actuator by a drive mode position sensor and generating information regarding the drive mode position, and allowing only a switching operation between predetermined two different drive mode positions corresponding to both ends of a working range of the shift actuator at which motion of the shift actuator is stopped mechanically, in presence of a failure in the drive mode position sensor of a transfer drive mode switching control system.

The other objects and features of this invention will become understood from the following description with reference to the accompanying drawings.

BRIEF DESCRIPTION OF THE DRAWINGS

FIG. 5 is a chart concerning signal patterns of shift actuator position switches SW1–SW4 of the drive mode position sensor, showing the relationship between the on-off signal patterns of shift actuator position switches SW1–SW4 and the transfer (T/F) shift position.

FIG. 6 is a table showing the relationship between the shifting operations of a manually-operated drive mode selector switch and the ON/OFF signal changes of shift actuator position switches SW1–SW4.

FIG. 7 is a flow chart showing a drive mode switching control routine executed within a transfer control unit (TFCU) incorporated in the transfer drive mode switching control system of the embodiment.

DESCRIPTION OF THE PREFERRED EMBODIMENTS

Figure 1:
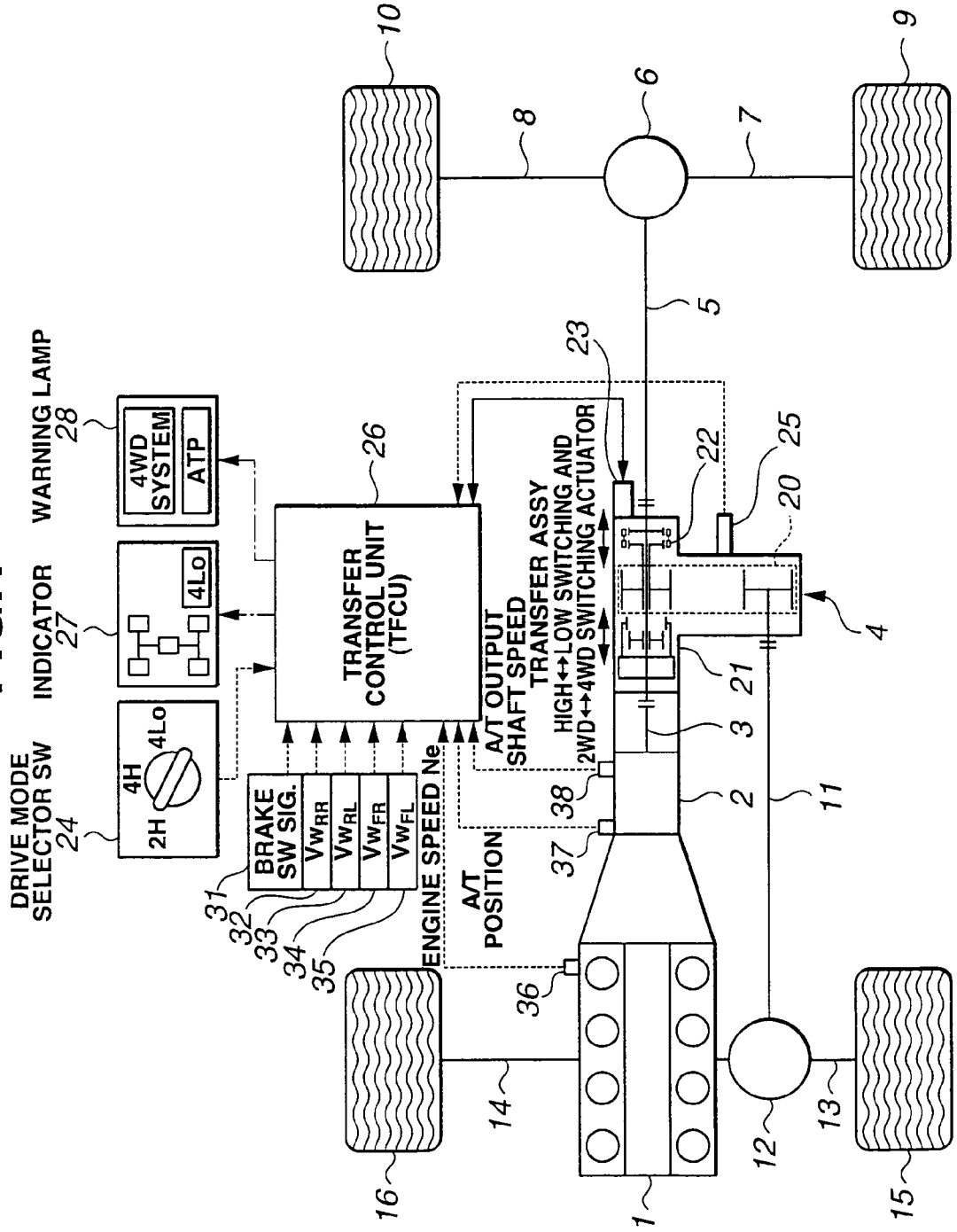
FIG. 1 is a system block diagram illustrating an embodiment of a transfer drive mode switching control system.

Referring now to the drawings, particularly to FIG. 1, the transfer drive mode switching control system of the embodiment is exemplified in an automotive vehicle capable of operating in a selected one of at least three drive modes, namely a two-wheel-drive high (2H) mode, a four-wheel-drive high (4H) mode, and a four-wheel-drive low (4LO) mode. In FIG. 1, reference sign 1 denotes an engine serving as a prime mover, reference sign 2 denotes an automatic transmission, reference sign 3 denotes a transmission output shaft, reference sign 4 denotes a transfer device (simply, a transfer), reference sign 5 denotes a rear propeller shaft, reference sign 6 denotes a rear differential, reference sign 7 denotes a rear-left axle drive shaft, reference sign 8 denotes a rear-right axle drive shaft, reference sign 9 denotes a rear-left road wheel, and reference sign 10 denotes a rear-right road wheel. In FIG. 1, reference sign 11 denotes a front propeller shaft, reference sign 12 denotes a front differential, reference sign 13 denotes a front-left axle drive shaft, reference sign 14 denotes a front-right axle drive shaft, reference sign 15 denotes a front-left road wheel, and reference sign 16 denotes a front-right road wheel.

As can be seen from the power train layout shown in FIG. 1, when the two-wheel-drive (2WD) mode, that is, 2H mode, is selected by means of transfer 4, driving torque (driving force) flows from engine 1 through automatic transmission 2 to transfer 4. During the selection of the 2WD mode, the transfer device functions to transfer the driving torque through rear propeller shaft 5 and rear differential 6 via rear axle drive shafts 7 and 8 to rear road wheels 9 and 10, so as to achieve the selected two-wheel-drive mode. On the contrary, when the four-wheel-drive (4WD) mode, that is, either the 4H, or 4LO mode, is selected by means of transfer 4, a driving torque flows from engine 1 through automatic transmission 2 to transfer 4. During the selection of the 4WD mode, the transfer device functions to transfer part of the driving torque through rear propeller shaft 5 and rear differential 6 via rear axle drive shafts 7 and 8 to rear road wheels 9 and 10, and simultaneously functions to transfer the remaining driving torque through front propeller shaft 11 and front differential 12 via front axle drive shafts 13 and 14 to front road wheels 15 and 16, so as to achieve the selected four-wheel-drive mode.

The transfer device 4 is comprised of a drive transmission chain 20, a high-gear and low-gear switching mechanism (simply, a high/low switching mechanism) 21, a 2WD–4WD switching mechanism 22, and a shift motor (an electric motor) 23. High/low switching mechanism 21 is provided for switching between high and low gear ratios for the transfer gear box. 2WD–4WD switching mechanism 22 is provided for switching between the 2WD and 4WD modes. Either one of the 2H, 4H, and 4LO is selected by a combined switching operation of high/low switching mechanism 21 and 2WD–4WD switching mechanism 22. In the mode switching control system of the embodiment, switching operation of high/low switching mechanism 21 and switching operation of 2WD–4WD switching mechanism 22 are achieved by means of only the sole shift motor 23 in response to a command signal from a transfer control unit (TFCU) 26 (described later). That is, shift motor 23 serves as a high-low switching and 2WD–4WD switching actuator. In the exemplified 4WD vehicle shown in FIG. 1, during the 4WD mode, the driving torque is essentially equally delivered to both the front and rear axles with high/low switching mechanism 21 kept at the high gear mode position and 2WD–4WD switching mechanism 22 kept at the 4WD mode position, to provide a so-called rigid 4WD operating mode.

As clearly shown in FIG. 1, the transfer drive mode switching control system of the embodiment, which controls operation of shift motor 23, is comprised of a manually-operated drive mode selector switch 24, a drive mode position sensor 25 (serving as drive mode position detection means), a drive mode indicator 27, a warning lamp 28, and transfer control unit (TFCU) 26.

Drive mode selector switch 24 serves as a man-machine interface. Drive mode selector switch 24 is located at such a position as to be easily manipulated by the driver, for example in an automobile instrument panel containing indicating meters or an instrument cluster assembly. As shown in FIG. 1, drive mode selector switch 24 is manually operated by the driver to switch from one of the two-wheel-drive high (2H) mode, the four-wheel-drive high (4H) mode, and the four-wheel-drive low (4LO) mode to the other.

Drive mode position sensor 25 is attached to or mechanically linked to a shift-motor output shaft 23a (described later in reference to FIGS. 2 and 4). Drive mode position sensor 25 includes four shift actuator position switches SW1, SW2, SW3, and SW4. A combination of on or off signals, which are generated from shift actuator position switches SW1–SW4 operable within a set rotational range (or a set angular range or a set movable range), is used to discriminate or identify whether a shift position of transfer 4 is conditioned in either the two-wheel-drive high (2H) mode position, the four-wheel-drive high (4H) mode position, the neutral (N) mode position, or the four-wheel-drive low (4LO) mode position.

Figure 8:
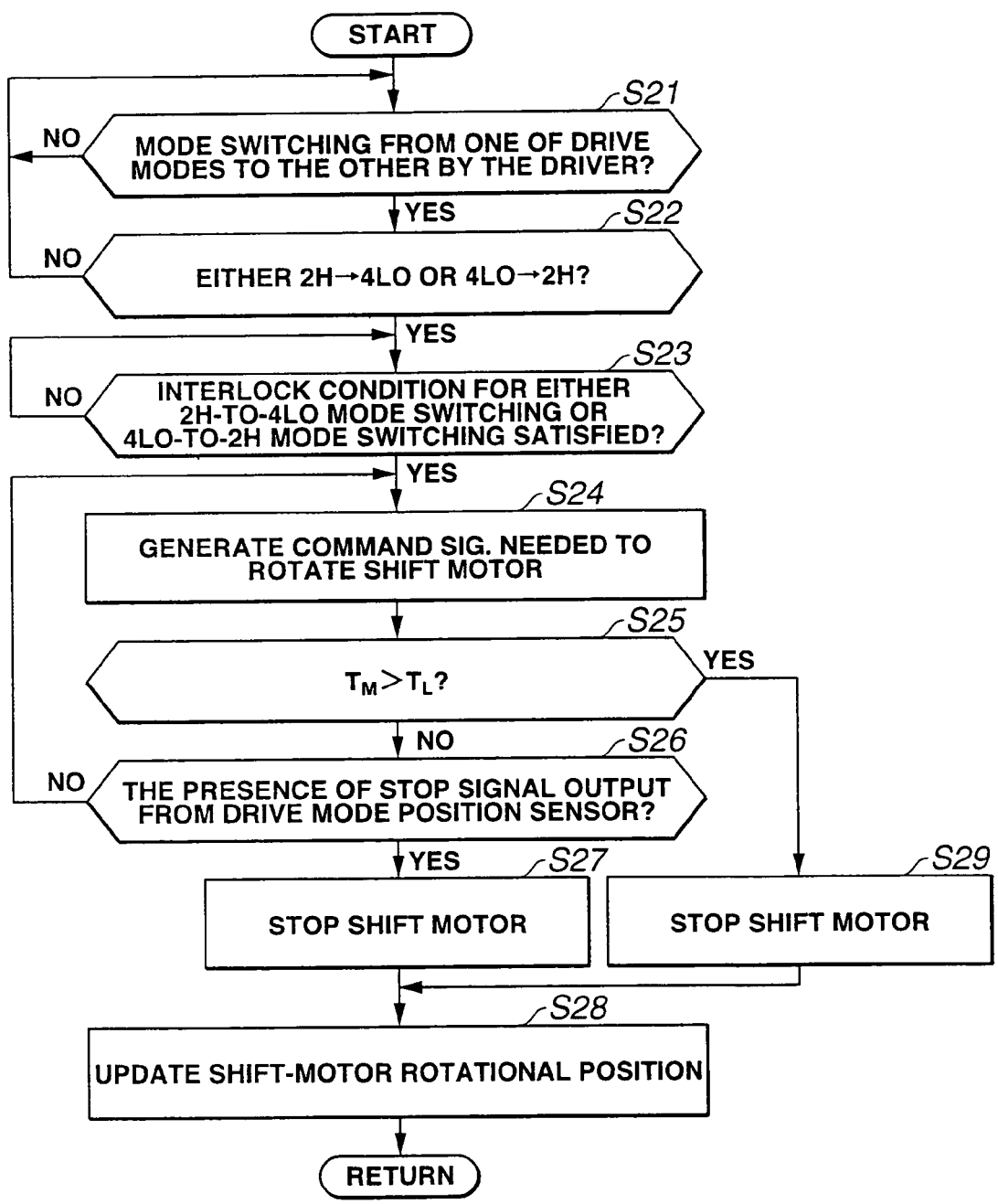
FIG. 8 is a flow chart showing a drive mode switching control subroutine executed within the TFCU in presence of a failure in the drive mode position sensor.

Transfer control unit (TFCU) 26 generally comprises a microcomputer. TFCU 26 includes an input/output interface (I/O), memories (RAM, ROM), and a microprocessor or a central processing unit (CPU). The input/output interface (I/O) of TFCU 26 receives input information from various engine/vehicle switches and sensors. As described later in detail in reference to the flow chart shown in FIG. 7, when the I/O circuitry of TFCU 26 receives a drive mode selector signal from drive mode selector switch 24, the processor of TFCU 26 determines whether a predetermined interlock condition, which will be described later in reference to step S2 of FIG. 7 and step S23 of FIG. 8, is satisfied. When the predetermined interlock condition is satisfied, the output interface circuitry of TFCU 26 generates a command signal needed to energize shift motor 23 for initiating a drive mode switching operation. The I/O circuitry of TFCU 26 also receives a drive mode position sensor signal from drive mode position sensor 25, indicative of the current drive mode position. When the current drive mode position sensor signal obtained after the drive mode switching operation is identical to the driver-selected drive mode position, shift motor 23 is de-energized and kept in the stopped state. That is, the signal output from drive mode position sensor 25, indicative of the driver-selected drive mode, serves as a stop signal used to stop or de-energize shift motor 23. In the drive mode switching control system of the embodiment, in addition to the drive mode selector signal from drive mode selector switch 24 and the drive mode position sensor signal from drive mode position sensor 25, the I/O interface circuitry of TFCU 26 also receives the other engine/vehicle switches and sensors, namely a brake switch 31, rear-right, rear-left, front-right, and front-left wheel speed sensors 32, 33, 34, and 35, an engine speed sensor 36, an inhibitor switch 37, and a transmission output speed sensor 38. When the brake pedal is depressed, brake switch 31 is turned ON. Conversely when the brake pedal is undepressed, brake switch 31 is turned OFF. Rear-right, rear-left, front-right, and front-left wheel speed sensors 32, 33, 34, and 35 are generally located at the respective road wheels 10, 9, 16, and 15, to sense rear-right, rear-left, front-right, and front-left wheel speeds $Vw_{RR}$, $Vw_{RL}$, $Vw_{FR}$, and $Vw_{FL}$, which are collectively referred to as "Vwi". A crank angle sensor is generally used as engine speed sensor 36. The crank angle sensor (engine speed sensor 36) generates a reference pulse signal REF at a predetermined crank angle for every crank angle 720°/n, and simultaneously generates a unit pulse signal POS (1° signal or 2° signal) for every unit crank angle (1° or 2°). The CPU of TFCU 26 arithmetically calculates the engine speed Ne based on the period of the reference pulse signal REF from the crank angle sensor. Inhibitor switch 37 generates a signal indicative of an automatic transmission (A/T) position, that is, an operating range position. Transmission output speed sensor 38 is provided to detect an output shaft speed of the automatic transmission.

Drive mode indicator 27 is located at an easily visible position within the driver's compartment instrument panel, to indicate the selected transfer drive mode responsively to a command signal from the output interface of TFCU 26. On the other hand, warning lamp 28 is also located at an easily visible position within the driver's compartment instrument panel. For instance, in the event of a 4WD system failure occurring within 2WD–4WD switching mechanism 22 or a failure in the shifting system of high/low switching mechanism 21, the driver is warned by flashing or turning on warning lamp 28 responsively to a command signal from the output interface of TFCU 26.

Within TFCU 26, the central processing unit (CPU) allows the access by the I/O interface of input informational data signals from the previously-discussed engine/vehicle switches and sensors 24–25, and 31–38. The CPU of TFCU 26 is responsible for carrying the predetermined control program stored in memories and is capable of performing necessary arithmetic and logic operations, which will be hereinafter described in detail in reference to the low charts shown in FIGS. 7 and 8. Computational results (arithmetic calculation results), that is, calculated output signals are relayed through the output interface circuitry of TFCU 26 to output stages containing shift motor 23 included in the transfer drive mode switching control system.

Figure 2:
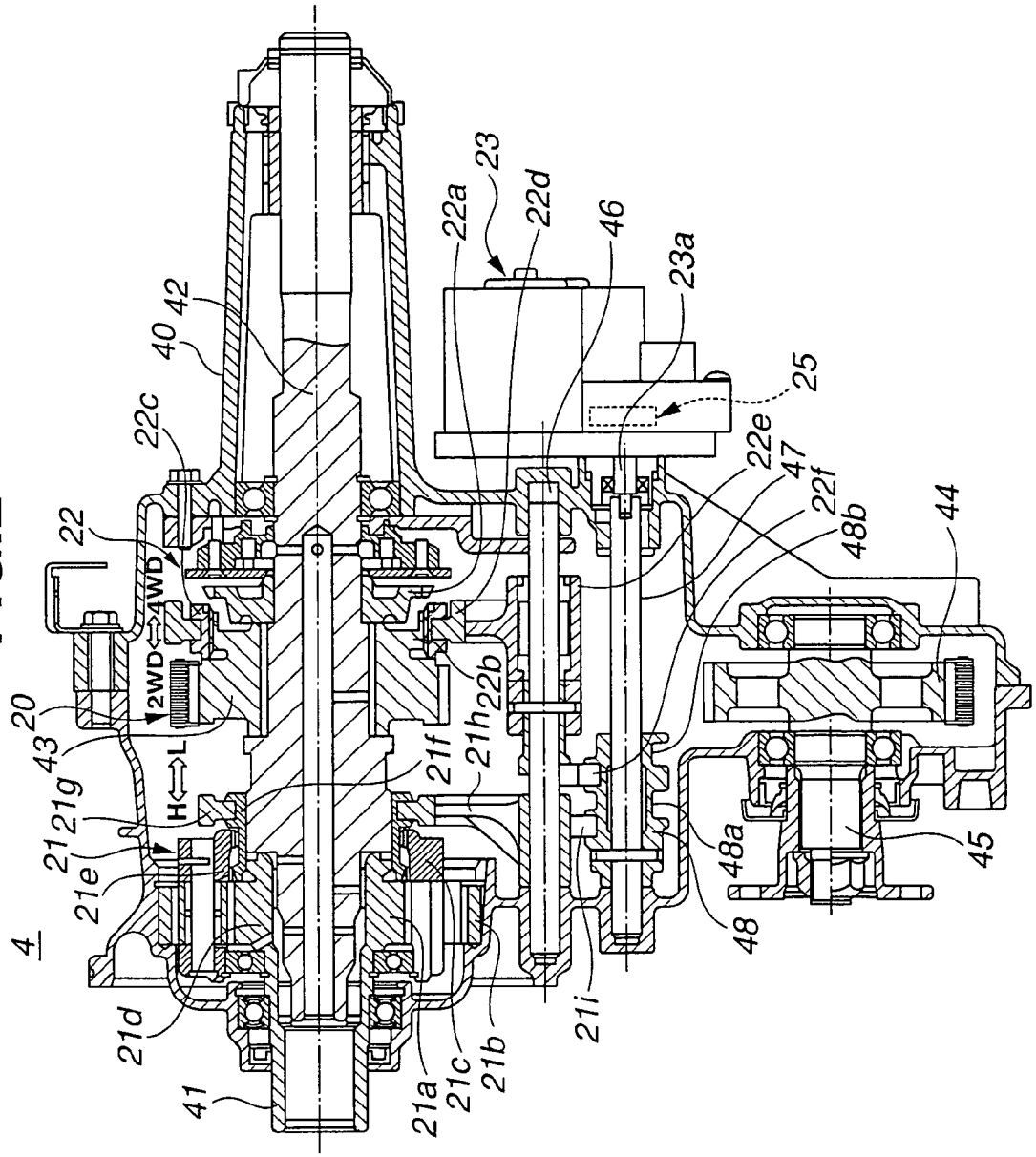
FIG. 2 is a longitudinal cross-sectional view showing a transfer device to which the transfer drive mode switching control system of the embodiment is applicable.

Referring now to FIG. 2, there is shown the detailed cross section of transfer 4 shown in FIG. 1. In FIG. 2, reference sign 40 denotes a transfer case, reference sign 41 denotes a transfer input shaft, reference sign 42 denotes a transfer rear output shaft, reference sign 43 denotes an input-side chain sprocket, reference sign 44 denotes an output-side chain sprocket, reference sign 45 denotes a transfer front output shaft, reference sign 46 denotes a slide shaft, reference sign 47 denotes a cylindrical cam shaft, and reference sign 48 denotes a cylindrical cam. In FIG. 2, the member denoted by reference sign 20 is the drive transmission chain, the member denoted by reference sign 21 is the high/low switching mechanism, and the member denoted by reference sign 22 is the 2WD–4WD switching mechanism.

High/low switching mechanism 21 is comprised of a two-speed gear device and a gearshift device. The two-speed gear device of high/low switching mechanism 21 is constructed by a so-called single-planet-pinion carrier equipped planetary gearset, which consists of a sun gear 21a, a ring gear 21b, planet pinions being in meshed engagement with sun gear 21a and ring gear 21b, and a single-planet-pinion carrier 21c in which the pinions are rotatably held. Sun gear 21a is formed integral with transfer input shaft 41. Ring gear 21b is fixedly connected to transfer case 40. On the other hand, the gearshift device of high/low switching mechanism 21 is comprised of a high gear portion 21d, a low gear portion 21e, a first coupling sleeve 21f, a first shift fork 21g, a first slide sleeve 21h, and a first pin 21i (see FIGS. 2 and 3). Sun gear 21a is formed integral with high gear portion 21d, whereas pinion carrier 21c is formed integral with low gear portion 21e. First coupling sleeve 21f is slidably fitted onto the outer periphery of transfer rear output shaft 42 by way of spline engagement, to permit axial sliding motion of first coupling sleeve 21f relative to transfer rear output shaft 42 and to inhibit relative rotation of first coupling sleeve 21f to transfer rear output shaft 42. First shift fork 21g is substantially annular in shape and engaged with or fitted onto the outer periphery of first coupling sleeve 21f. First slide sleeve 21h is fixedly connected at one end to first shift fork 21g. The other end of first slide sleeve 21h is provided movably on slide shaft 46. First pin 21i is fixedly connected to first slide sleeve 21h. The previously-noted slide shaft 46 is laid out in parallel with the axis of transfer rear output shaft 42. Additionally, slide shaft 46 is provided to be movable in opposite axial directions relative to transfer case 40.

When first coupling sleeve 21f is held in the position shown in FIG. 2, transfer input shaft 41 and transfer rear output shaft 42 are directly coupled with each other via sun gear 21a and first coupling sleeve 21f, to provide a high gear mode in which the gear ratio of the transfer gear box is "1". In contrast, when first coupling sleeve 21f displaces or shifts from the axial position shown in FIG. 2 axially rightwards (viewing FIG. 2), transfer input shaft 41 and transfer rear output shaft 42 are coupled with each other via the sun gear 21a, pinions, pinion carrier 21c, and first coupling sleeve 21f, to provide a low gear mode in which a reduction gear ratio is obtained as a ratio between the number of teeth of sun gear 21a and the number of teeth of ring gear 21b.

2WD–4WD switching mechanism 22 is comprised of a 4WD gear portion 22a, a 4WD input gear portion 22b, a second coupling sleeve 22c, a second shift fork 22d, a second slide sleeve 22e, and a second pin 22f. 4WD gear portion 22a is splined to the outer periphery of transfer rear output shaft 42. Input-side chain sprocket 43, which is mounted rotatably on the outer periphery of transfer rear output shaft 42, is formed integral with 4WD input gear portion 22b. When the 2WD operating mode is selected, second coupling sleeve 22c is brought into meshed-engagement with only the 4WD gear portion 22a. On the contrary, when the 4WD operating mode is selected, second coupling sleeve 22c is brought into meshed-engagement with both the 4WD gear portion 22a and 4WD input gear portion 22b. Second shift fork 22d is substantially annular in shape and engaged with or fitted onto the outer periphery of second coupling sleeve 22c. Second slide sleeve 22e is fixedly connected at one end to second shift fork 22d. The other end of second slide sleeve 22e is fixedly connected to slide shaft 46. Second pin 22f is fixedly connected to second slide sleeve 22e.

When second coupling sleeve 22c is held in the position shown in FIG. 2, transfer rear output shaft 42 is uncoupled from input-side chain sprocket 43 to provide a two-wheel-drive mode (a rear-wheel-drive mode). In contrast when second coupling sleeve 22c displaces or shifts from the axial position shown in FIG. 2 axially rightwards, transfer rear output shaft 42 is coupled with input-side chain sprocket 43 through 4WD gear portion 22a, second coupling sleeve 22c, and 4WD input gear portion 22b, to provide a four-wheel-drive mode. During the 4WD mode, the driving torque, transferred to input-side chain sprocket 43, is transmitted through drive transmission chain 20, output-side chain sprocket 44, and transfer front output shaft 45 to front propeller shaft 11.

Cylindrical cam shaft 47 is coaxially arranged with the axis of shift-motor output shaft 23a and fixedly connected to shift-motor output shaft 23a for co-rotation during rotation of shift-motor output shaft 23a with shift motor 23 energized. As clearly shown in FIG. 2, cylindrical cam 48 is fixedly connected to cylindrical cam shaft 47 by way of pin-connection.

Figure 3:
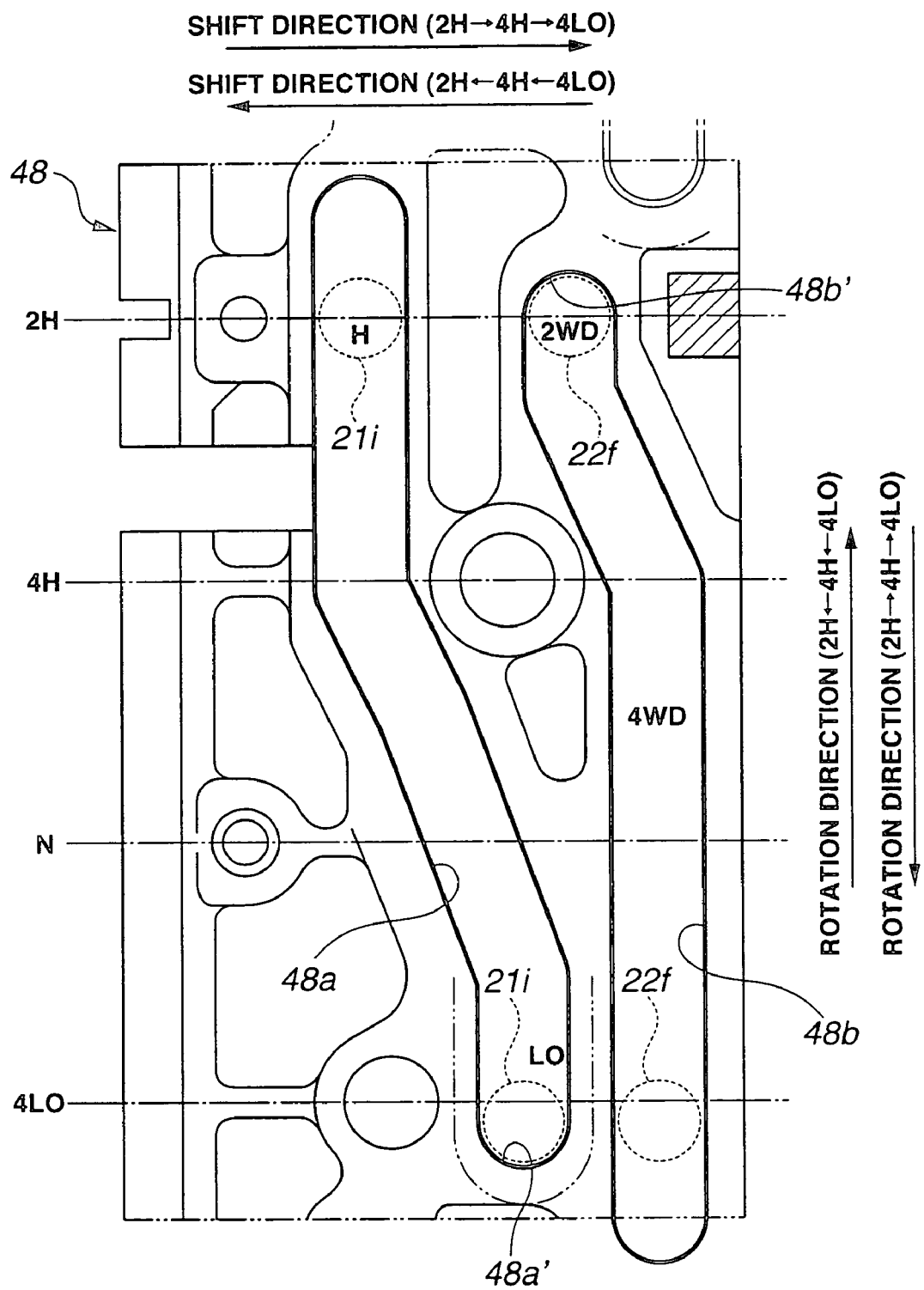
FIG. 3 is a development showing a dual-grooved cylindrical cam incorporated in the transfer of FIG. 2.

As best shown in FIG. 3, cylindrical cam 48 is formed on its cylindrical outer periphery with (i) a high-gear and low-gear cam groove (simply, a high/low cam groove) 48a that engages first pin 21i and (ii) a 2WD–4WD cam groove 48b that engages second pin 22f. As can be seen from the development of cylindrical cam 48 shown in FIG. 3, high/low cam groove 48a is comprised of three cam groove sections. The first cam groove section of high/low cam groove 48a is formed as a comparatively long straight cam groove section perpendicular to the axis of cylindrical cam shaft 47 and ranging from the two-wheel-drive high (2H) mode position to the four-wheel-drive high (4H) mode position. The second cam groove section of high/low cam groove 48a is formed as a comparatively long oblique cam groove section inclined with respect to the axis of cylindrical cam shaft 47 and ranging from the 4H mode position to a predetermined position slightly before the four-wheel-drive low (4LO) mode position. The third cam groove section of high/low cam groove 48a is formed as a comparatively short straight cam groove section perpendicular to the axis of cylindrical cam shaft 47 and ranging from the predetermined position slightly before the 4LO mode position to a predetermined position slightly after the 4LO mode position. The portion denoted by reference sign 48a' is a circular-arc shaped low-gear side cam groove end of the comparatively short straight cam groove section ranging from the predetermined position slightly before the 4LO mode position to the predetermined position slightly after the 4LO mode position. On the other hand, 2WD–4WD cam groove 48b is also comprised of three cam groove sections. The first cam groove section of 2WD–4WD cam groove 48b is formed as a comparatively short straight cam groove section perpendicular to the axis of cylindrical cam shaft 47 and ranging from a circular-arc shaped 2WD side cam groove end 48b' to a predetermined position slightly after the 2H mode position. The second cam groove section of 2WD–4WD cam groove 48b is formed as a comparatively short oblique cam groove section inclined with respect to the axis of cylindrical cam shaft 47 and ranging from the predetermined position slightly after the 2H mode position to the 4H mode position. The third cam groove section of 2WD–4WD cam groove 48b is formed as a comparatively long straight cam groove section perpendicular to the axis of cylindrical cam shaft 47 and ranging from the 4H mode position to a predetermined position slightly after the 4LO mode position.

Figure 4:
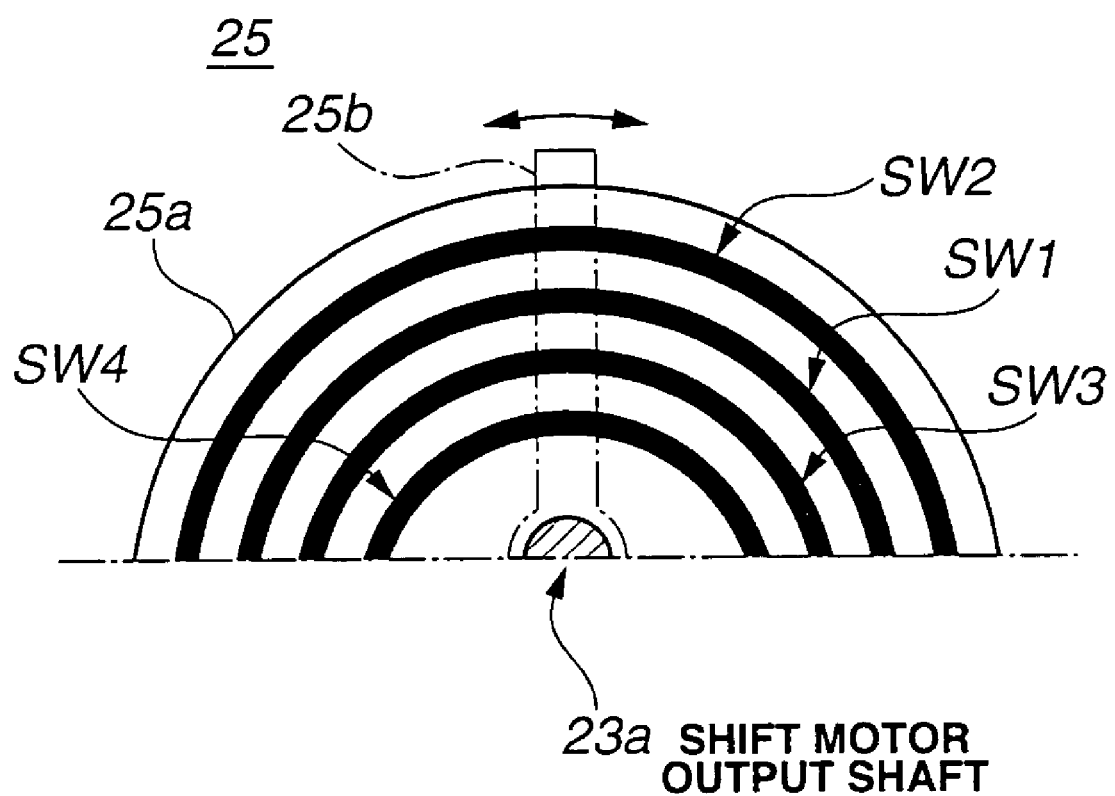
FIG. 4 is a schematic diagram showing a drive mode position sensor incorporated in the transfer drive mode switching control system of the embodiment.

The detailed structure and operation of drive mode position sensor 25 are described hereunder by reference to FIGS. 4–6.

As shown in FIG. 4, drive mode position sensor 25 is fixedly connected to a shift motor casing of shift motor 23. Drive mode position sensor 25 includes a switch basal plate 25a having four annular switch circuits, which are arranged coaxially with respect to the axis of shift-motor output shaft 23a, and an I-shaped movable switching portion 25b extending radially with respect to each of the four annular switch circuits. Each annular switch circuit of switch basal plate 25a and movable switching portion 25b are electrically connected to or disconnected from each other depending on the angular position of movable switching portion 25b, so as to generate an ON signal or an OFF signal. That is, the four annular switch circuits of switch basal plate 25a and movable switching portion 25b provide four different shift actuator position switches SW1, SW2, SW3, and SW4 that produce four different ON/OFF signal patterns.

As seen from the ON/OFF signal-pattern chart of FIG. 5, the first shift actuator position switch SW1 is turned ON in the 2WD mode range (or in the 2H mode range), and turned OFF in the 2WD–4H range, in the 4H mode range, in the 4H–N range, and in the neutral (N) mode range. Additionally, the first shift actuator position switch SW1 is turned ON in the N–4LO range and in the 4LO mode range.

The second shift actuator position switch SW2 is turned OFF in the 2WD mode range (or in the 2H mode range), and turned ON in the 2WD–4H range. The second shift actuator position switch SW2 is turned OFF in the 4H mode range and in a predetermined partial portion of the 4H–N range adjacent to the 4H mode range. The second shift actuator position switch SW2 is turned ON in a predetermined large portion of the 4H–N range continuous with the N mode range, in the N mode range, in the N–4LO range, and in the 4LO mode range.

The third shift actuator position switch SW3 is turned ON in the 2WD mode range (or in the 2H mode range), in the 2WD–4H range, and in the 4H mode range. The third shift actuator position switch SW3 is turned OFF in the 4H–N range, in the N mode range, in the N–4LO range, and in the 4LO mode range.

The fourth shift actuator position switch SW4 is turned OFF in the 2WD mode range (or in the 2H mode range), and in a predetermined large portion of the 2WD–4H range continuous with the 2WD mode range. The fourth shift actuator position switch SW4 is turned ON in a predetermined partial portion of the 2WD–4H adjacent to the 4H mode range, in the 4H mode range, and in the 4H–N range. The fourth shift actuator position switch SW4 is turned OFF in the N mode range and in the N–4LO range. The fourth shift actuator position switch SW4 is turned ON in the 4LO mode range.

As can be seen from the mode-selector shifting pattern versus ON/OFF signal change table of FIG. 6, when drive mode selector switch 24 is switched from the two-wheel-drive high (2H) mode to the four-wheel-drive high (4H)

mode by the driver, a transition (ON→OFF) of second shift actuator position switch SW2 from an ON state to an OFF state occurs. That is, the presence of the transition (ON→OFF) of second shift actuator position switch SW2 from ON to OFF means switching (2H→4H) of drive mode selector switch 24 from 2H to 4H. In other words, the processor of TFCU 26 determines that switching (2H→4H) of drive mode selector switch 24 from 2H to 4H occurs, in presence of the transition (ON→OFF) of second shift actuator position switch SW2 from ON to OFF.

When drive mode selector switch 24 is switched from the 4H mode to the 4LO mode by the driver, a transition (OFF→ON) of fourth shift actuator position switch SW4 from an OFF state to an ON state occurs. That is, the presence of the transition (OFF→ON) of fourth shift actuator position switch SW4 from OFF to ON means switching (4H→4LO) of drive mode selector switch 24 from 4H to 4LO. In other words, the processor of TFCU 26 determines that switching (4H→4LO) of drive mode selector switch 24 from 4H to 4LO occurs in presence of the transition (OFF→ON) of fourth shift actuator position switch SW4 from OFF to ON.

When drive mode selector switch 24 is switched from the 2H mode to the 4LO mode by the driver, first shift actuator position switch SW1 remains turned ON, third shift actuator position switch SW3 remains turned OFF, a transition (OFF→ON) of fourth shift actuator position switch SW4 from an OFF state to an ON state occurs. That is, a combination of the state of first shift actuator position switch SW1 remaining turned ON, the state of third shift actuator position switch SW3 remaining turned OFF, and the presence of the transition (OFF→ON) of fourth shift actuator position switch SW4 from OFF to ON means switching (2H→4LO) of drive mode selector switch 24 from 2H to 4LO. In other words, the processor of TFCU 26 determines that switching (2H→4LO) of drive mode selector switch 24 from 2H to 4LO occurs in presence of the transition (OFF→ON) of fourth shift actuator position switch SW4 from OFF to ON under the condition that first and third shift actuator position switches SW1 and SW3 remain turned OFF.

When drive mode selector switch 24 is switched from the 4LO mode to the 4H mode by the driver, a transition (OFF→ON) of third shift actuator position switch SW3 from an OFF state to an ON state occurs. That is, the presence of the transition (OFF→ON) of third shift actuator position switch SW3 from OFF to ON means switching (4LO→4H) of drive mode selector switch 24 from 4LO to 4H. In other words, the processor of TFCU 26 determines that switching (4LO→4H) of drive mode selector switch 24 from 4LO to 4H occurs in presence of the transition (OFF→ON) of third shift actuator position switch SW3 from OFF to ON.

When drive mode selector switch 24 is switched from the 4H mode to the 2H mode by the driver, or when drive mode selector switch 24 is switched from the 4LO mode to the 2H mode by the driver, a transition (OFF→ON) of first shift actuator position switch SW1 from an OFF state to an ON state occurs. That is, the presence of the transition (OFF→ON) of first shift actuator position switch SW1 from OFF to ON means either switching (4H→2H) of drive mode selector switch 24 from 4H to 2H or switching (4LO→2H) of drive mode selector switch 24 from 4LO to 2H. In other words, the processor of TFCU 26 determines that either switching (4H→2H) of drive mode selector switch 24 from 4H to 2H or switching (4LO→2H) of drive mode selector switch 24 from 4LO to 2H occurs in presence of the transition (OFF→ON) of first shift actuator position switch SW1 from OFF to ON.

Referring now to FIG. 7, there is shown the drive mode switching control routine executed within TFCU 26 of the transfer drive mode switching control system of the embodiment. The control routine shown in FIG. 7 is executed as time-triggered interrupt routines to be triggered every predetermined sampling time intervals.

At step S1, a check is made to determine whether manual mode switching (or manual mode selection) from one of the drive modes (2H, 4H, 4LO) to the other occurs via the manually-operated drive mode selector switch 24. When the answer to step S1 is in the affirmative (YES), that is, in presence of the manual mode switching operation, the routine proceeds from step S1 to step S2. Conversely when the answer to step S1 is in the negative (NO), step S1 is repeatedly executed.

At step S2, a check is made to determine whether a predetermined interlock condition is satisfied. The predetermined interlock condition means a drive mode switching enabling condition under which the drive mode switching operation of the transfer drive mode switching control system is allowed or enabled. For instance, as the predetermined interlock condition for switching from the 2H mode to the 4H mode, a condition that the wheel speed difference ($|Vw_F - Vw_R|$) between front and rear wheel speeds $Vw_F$ and $Vw_R$ is less than or equal to a predetermined threshold value (or a predetermined constant value) is often used. As the predetermined interlock condition for switching from the 4H mode to the 4LO mode, four conditions that (i) the operating range position of automatic transmission 2, detected by inhibitor switch 37, is identical to the neutral (N) range position, (ii) wheel speed Vwi is 0 km/h, (iii) engine speed Ne, detected by engine speed sensor 36, is within a predetermined engine-speed range, for example, a speed range from 350 rpm to 1600 rpm, and (iv) a brake switch signal from brake switch 31 is turned ON with the brake pedal depressed, are often used. When the answer to step S2 is affirmative (YES), that is, the interlock condition is satisfied, the routine proceeds from step S2 to step S3. Conversely when the answer to step S2 is negative (NO), that is, the interlock condition is unsatisfied, step S2 is repeatedly executed.

At step S3, TFCU 26 generates a command signal needed to energize and rotate or operate shift motor 23 in a direction in which the driver-selected drive mode (exactly, the drive mode selected by the driver via drive mode selector switch 24) is attained. After step S3, step S4 occurs.

At step S4, a check is made to determine whether an elapsed time $T_M$, measured from the time when shift motor 23 begins to rotate or operate, exceeds a predetermined time limit $T_L$. When the answer to step S4 is affirmative (YES), that is, in case of $T_M > T_L$, the routine flows from step S4 to step S8. Conversely when the answer to step S4 is negative (NO), that is, $T_M \leq T_L$, the routine flows from step S4 to step S5. The previously-noted predetermined time limit $T_L$ means a maximum allowable energizing time, such as five seconds, which is set to protect shift motor 23 and to prevent the damage to shift motor 23.

At step S5, the processor of TFCU 26 executes a check for the presence or absence of the output of the stop signal from drive mode position sensor 25. When the answer to step S5 is affirmative (YES), that is, when the signal from drive mode position sensor 25 indicates the driver-selected drive mode position and thus the stop signal output is present, the routine proceeds from step S5 to step S6. Conversely when the answer to step S5 is negative (NO), that is, when the stop signal output from drive mode position sensor 25 is absent, the routine returns from step S5 to step S3, so as to continuously maintain shift motor 23 in the energized state.

At step S6, shift motor 23 is stopped immediately when the stop signal has been output from drive mode position sensor 25. After step S6, step S7 occurs.

At step S7, the old shift-motor rotational position (the previous value of the shift-motor rotational position detected by drive mode position sensor 25 and calculated one execution cycle before), already stored in the predetermined memory address of the RAM of TFCU 26, is updated by the new shift-motor rotational position (the current value of the shift-motor rotational position detected and calculated at the current execution cycle). Thereafter, the main program is returned.

At step S8, the processor of TFCU 26 determines that there is either a failure in drive mode position sensor 25 or a problem of an inoperative shift motor, arising from breaking of the wire harness for shift motor 23 or burning of the motor coil of shift motor 23, under the condition that the answer to step S4 is affirmative (YES), that is, the condition defined by $T_M > T_L$ is satisfied. On the basis of the result of failure diagnostic check, i.e., in presence of the drive mode position sensor failure or in presence of the problem of the inoperative shift motor, the processor of TFCU 29 generates a command signal that stops shift motor 23. After step S8, step S9 occurs.

At step S9, a comparison check between (i) the previous shift-motor rotational position detected and calculated one cycle before and (ii) the current shift-motor rotational position at which shift motor 23 is actually held after the motor stopping procedure of step S8, is made. Concretely, the comparison check is made to determine whether the previous shift-motor rotational position calculated one cycle before is identical to the current shift-motor rotational position. After step S9, step S10 occurs.

At step S10, a check is made to determine, based on the comparison result executed through step S9, whether shift motor 23 is operable. When the previous shift-motor rotational position calculated one cycle before is different from the current shift-motor rotational position, the processor of TFCU 26 determines or diagnoses that shift motor 23 is normal and operable, and thereafter the routine flows from step S10 to step S11. Conversely when the previous shift-motor rotational position calculated one cycle before is identical to the current shift-motor rotational position, the processor of TFCU 26 determines or diagnoses that shift motor 23 is abnormal and inoperable and thus there is a shift-motor failure, and thereafter the routine flows from step S10 to step S12.

At step S11, on the basis of the diagnostic result of step S10 indicating that the operation of shift motor 23 is normal and shift motor 23 is operable, in other words, on the basis of the diagnostic result of step S10 indicating a failure in drive mode position sensor 25, which may output the stop signal if the drive mode position sensor failure is absent after completion of mode switching, the processor of TFCU 26 allows only the switching operation between two drive mode positions corresponding to both ends of the working range of shift motor 23 that rotary motion of shift-motor output shaft 23a of shift motor 23 clockwise or counterclockwise is prevented mechanically. Actually, in the system of the embodiment, in presence of the sensor failure in drive mode position sensor 25 and in absence of the motor failure in shift motor 23, at step S11, the processor of TFCU 26 allows only the switching operation between the 2H mode position and the 4LO mode position. Thereafter, the drive mode switching control subroutine of FIG. 8 suited for the presence of the drive mode position sensor failure is initiated.

At step S12, on the basis of the diagnostic result of step S10 indicating the shift motor failure, the processor of TFCU 26 inhibits a command signal needed to rotate or energize shift motor 23 from being output. In this manner, a series of drive mode switching control routine of FIG. 7 terminates.

In the control routine of FIG. 7, step S4 corresponds to a partially failed transfer drive mode switching control system condition diagnostic section. The flow from step S8 through steps S9–S10 to step S11 means that the failure in drive mode position sensor 25 is present but the failure in shift motor 23 is absent, whereas the flow from step S8 through steps S9–S10 to step S12 means the shift motor failure (or the inoperative shift motor, arising from breaking of the wire harness for shift motor 23 or burning of the motor coil of shift motor 23. In other words, the flow from step S8 through step S9 to step S10 corresponds to an actuator-and-sensor failure diagnostic section that diagnoses, based on the result of comparison between the previous shift-actuator position and the current shift-actuator position, whether shift motor 23 is failed or drive mode position sensor 25 is failed. Step S11 and steps S21–S28 (described hereunder) correspond to a drive mode position detection means failure countermeasure section (a drive mode position sensor failure countermeasure section).

Referring now to FIG. 8, there is shown the drive mode switching control subroutine that is initiated in presence of a failure in drive mode position sensor 25.

In the same manner as step S1 of FIG. 7, at step S21 of FIG. 8, a check is made to determine whether mode switching from one of the drive modes (2H, 4H, 4LO) to the other occurs via the manually-operated drive mode selector switch 24. When the answer to step S21 is in the affirmative (YES), that is, in presence of the manual mode switching operation, the subroutine proceeds from step S21 to step S22. Conversely when the answer to step S21 is in the negative (NO), step S21 is repeatedly executed.

At step S22, a check is made to determine whether the manual shifting operation of drive mode selector switch 24 is equal to either switching (2H→4LO) from the 2H mode to the 4LO mode or switching (4LO→2H) from the 4LO mode to the 2H mode. When the answer to step S22 is affirmative (YES), the subroutine proceeds from step S22 to step S23. Conversely when the answer to step S22 is negative (NO), the subroutine returns from step S22 to step S21.

At step S23, a check is made to determine whether a predetermined interlock condition for either 2H-to-4LO mode switching (2H→4LO) or 4LO-to-2H mode switching is satisfied. The predetermined interlock condition for either 2H-to-4LO mode switching (2H→4LO) or 4LO-to-2H mode switching means a drive mode switching enabling condition under which the drive mode switching operation of the transfer drive mode switching control system is allowed or enabled when switching from the 2H mode to the 4LO mode or when switching from the 4LO mode to the 2H mode. In the system of the embodiment, as the predetermined interlock condition suited to either 2H-to-4LO mode switching (2H→4LO) or 4LO-to-2H mode switching, four conditions that (i) the operating range position of automatic transmission 2, detected by inhibitor switch 37, is identical to the neutral (N) range position, (ii) wheel speed Vwi is 0 km/h, (iii) engine speed Ne, detected by engine speed sensor 36, is within a predetermined speed range, for example, a speed range from 350 rpm to 1600 rpm, and (iv) a brake switch signal from brake switch 31 is turned ON with the brake pedal depressed, are used. When the answer to step S23 is affirmative (YES), that is, when the predetermined interlock condition for either 2H-to-4LO mode switching (2H→4LO) or 4LO-to-2H mode switching is satisfied, the subroutine proceeds from step S23 to step S24. Conversely when the answer to step S23 is negative (NO), that is, when the predetermined interlock condition for either 2H-to-4LO mode switching (2H→4LO) or 4LO-to-2H mode switching is unsatisfied, step S23 is repeatedly executed.

At step S24, TFCU 26 generates a command signal needed to energize and rotate shift motor 23 in a direction in which the driver-selected drive mode, exactly, the drive mode selected by the driver via drive mode selector switch 24 (corresponding to the 4LO mode in case of manual mode switching from 2H to 4LO and corresponding to the 2H mode in case of manual mode switching from 4LO to 2H) is attained. After step S24, step S25 occurs.

At step S25, a check is made to determine whether elapsed time $T_M$, measured from the time when shift motor 23 begins to rotate, exceeds predetermined time limit $T_L$. When the answer to step S25 is affirmative (YES), that is, in case of $T_M > T_L$, the routine flows from step S25 to step S29. Conversely when the answer to step S25 is negative (NO), that is, $T_M \leq T_L$, the routine flows from step S25 to step S26.

At step S26, the processor of TFCU 26 executes a check for the presence or absence of the output of the stop signal from drive mode position sensor 25. When the answer to step S26 is affirmative (YES), that is, when the switch signal from the shift actuator position switch of drive mode position sensor 25 indicates the driver-selected drive mode position (the 4LO mode position in case of manual mode switching from 2H to 4LO; the 2H mode position in case of manual mode switching from 4LO to 2H) and thus the stop signal output is present, the routine proceeds from step S26 to step S27. Conversely when the answer to step S26 is negative (NO), that is, when there is no stop signal output from drive mode position sensor 25, the routine returns from step S26 to step S24, so as to continuously maintain shift motor 23 in the energized state. Note that the presence of the stop signal output from drive mode position sensor 25 at step S26 means that at least one of the first and fourth shift actuator position switches SW1 and SW4 of the partially failed drive mode position sensor system is normally operating.

At step S27, shift motor 23 is stopped immediately when the stop signal has been output from drive mode position sensor 25. After step S27, step S28 occurs.

At step S28, the old shift-motor rotational position (the previous value of the shift-motor rotational position detected and calculated one execution cycle before), already stored in the predetermined memory address of the RAM of TFCU 26, is updated by the new rotational position (the current value of the shift-motor rotational position detected and calculated at the current execution cycle). Thereafter, the main program is returned.

At step S29, under the condition that the answer to step S25 is affirmative (YES), that is, the condition defined by $T_M > T_L$ is satisfied, the processor of TFCU 26 determines that there is a failure in either the first shift actuator position switch SW1 or the fourth shift actuator position switch SW4 of the four shift actuator position switches SW1–SW4 of drive mode position sensor 25, which outputs the switch signal indicating that the driver-selected drive mode position (the 4LO mode position in case of manual mode switching from 2H to 4LO; the 2H mode position in case of manual mode switching from 4LO to 2H) has been attained. On the basis of the result of failure diagnostic check, i.e., in presence of the failure in either the first shift actuator position switch SW1 or the fourth shift actuator position switch SW4, the processor of TFCU 29 generates a command signal that stops shift motor 23. Thereafter, the subroutine flows from step S29 to step S28.

[In Normal Period of Drive Mode Switching Control System]

During the normal period of the drive mode switching control system, when switching from one of the drive modes to the other via drive mode selector switch 24 occurs, the routine of FIG. 7 flows from step S1 through steps S2, S3, and S4 to step S5. A series of steps S3–S5 are repeatedly executed until the input interface of TFCU 26 receives the stop signal from drive mode position sensor 25. That is, TFCU 26 generates a command signal required for energizing and rotating shift motor 23 such that the shift position of transfer 4 is shifted from the drive mode position before the mode switching operation to the drive mode position after the mode switching operation, that is, the driver-selected drive mode position, until drive mode position sensor 25 outputs the stop signal.

In this case, the drive mode switching control system is normally operating, and therefore the driver-selected drive mode position can be achieved by rotary motion of shift motor 23, before elapsed time $T_M$, measured from the time when shift motor 23 begins to rotate, exceeds predetermined time limit $T_L$. Therefore, immediately when drive mode position sensor 25 outputs the stop signal at step S5, the routine advances from step S5 to step S6. At step S6, shift motor 23 is stopped. At the next step S7, the previous value of the shift-motor rotational position detected and calculated one execution cycle before, already stored in the predetermined memory address of the RAM of TFCU 26, is updated by the current value of the shift-motor rotational position obtained at the current execution cycle.

As discussed above, in the normal state of the drive mode switching control system, when the transfer drive mode is manually switched from one of the drive modes to the other by drive mode selector switch 24, it is possible to normally execute drive mode switching control depending on a manual switching operation made to drive mode selector switch 24 by the driver, for example, a manual switching operation from the two-wheel-drive high (2H) mode position to the four-wheel-drive high (4H) mode position.

[In Presence of Shift Motor Failure]

When switching from one of the drive modes to the other via drive mode selector switch 24 occurs under a condition that shift motor 23 remains inoperative even during application of a drive current (a command signal) to shift motor 23, owing to breaking of the wire harness for shift motor 23, burning of the motor coil of shift motor 23 or the like, the routine of FIG. 7 flows from step S1 through steps S2, S3, and S4 to step S5. A series of steps S3–S5 are repeatedly executed until the input interface of TFCU 26 receives the stop signal from drive mode position sensor 25. That is, during repeated executions of steps S3–S5, TFCU 26 continues to output a command signal (a drive signal) to shift motor 23.

In the presence of the shift motor failure, shift motor 23 remains stopped even during application of a drive current (a command signal) to shift motor 23. Therefore, at step S5, the input interface of TFCU 26 never receives the stop signal from drive mode position sensor 25. As a result, elapsed time $T_M$, measured from the time when shift motor 23 begins to rotate, exceeds predetermined time limit $T_L$. Under the condition defined by $T_M > T_L$, the routine flows from step S4 through step S8 to step S9. At step S9, a comparison check between the previous shift-motor rotational position calculated one cycle before and the current shift-motor rotational position is made. Owing to the shift motor failure (the inoperative shift motor), the previous shift-motor rotational position calculated one cycle before is identical to the current shift-motor rotational position, and thus the processor of TFCU 26 determines or diagnoses that shift motor is inoperable. Therefore, the routine proceeds from step S10 to step S12. At step S12, on the basis of the diagnostic result of step S10 indicating the shift motor failure, the processor of TFCU 26 inhibits a drive signal output (a command signal output) from the output interface to shift motor 23.

As set forth above, when the transfer drive mode is manually switched from one of the drive modes to the other by drive mode selector switch 24 in presence of the shift motor failure (in case of the inoperative shift motor), the command signal (the drive signal) is merely output to shift motor 23 until predetermined time limit $T_L$ has expired. The command signal output to shift motor 23 is inhibited upon expiration of the predetermined time limit $T_L$ (see step S12 of FIG. 7). That is to say, the transfer shift position before the manual mode switching operation remains unchanged. In the presence of such a shift motor failure, the driver is warned and informed of the drive mode switching control system failure (by flashing or turning on warning lamp 28.

[In Presence of Drive Mode Position Sensor Failure]

When switching from one of the drive modes to the other via drive mode selector switch 24 occurs in presence of a failure in drive mode position sensor 25, the routine of FIG. 7 flows from step S1 through steps S2, S3, and S4 to step S5. A series of steps S3–S5 are repeatedly executed until the input interface of TFCU 26 receives the stop signal from drive mode position sensor 25. That is, during repeated executions of steps S3–S5, TFCU 26 continues to output a command signal (a drive signal) to shift motor 23.

In the presence of the drive mode position sensor failure, the input interface of TFCU 26 cannot permanently receive the stop signal from drive mode position sensor 25. As a result, elapsed time $T_M$, measured from the time when shift motor 23 begins to rotate, exceeds predetermined time limit $T_L$. Under the condition defined by $T_M > T_L$, the routine flows from step S4 through step S8 to step S9. At step S9, the previous shift-motor rotational position calculated one cycle before becomes different from the current shift-motor rotational position, and thus the processor of TFCU 26 determines or diagnoses that shift motor 23 is normal and operable. Therefore, the routine proceeds from step S10 to step S11. At step S11, based on the diagnostic result of step S10 indicating that shift motor 23 is normal and operable, in other words, drive mode position sensor 25 is failed, the processor of TFCU 26 allows only the switching operation between two drive mode positions corresponding to both ends (i.e., the 2H mode position and the 4LO mode position) of the working range of shift motor 23 at which rotary motion of shift-motor output shaft 23a of shift motor 23 clockwise or counterclockwise is prevented and stopped mechanically.

As set out above, at least one of the shift motor failure and the drive mode position sensor failure is considered as a factor that there is no stop signal output from drive mode position sensor 25 irrespective of expiration of predetermined time limit $T_L$. According to the system of the embodiment, when the diagnostic result of step S10 is affirmative and thus shift motor 23 is normal and operable (see the flow from step S8 through steps S9–S10 to step S11), the processor of TFCU 26 can necessarily determine or diagnose that there is a failure in drive mode position sensor 25.

As described previously, in presence of a failure in drive mode position sensor 25, the transfer drive mode switching control system never inhibits the drive mode switching control, but allows only the switching operation between two drive mode positions corresponding to both ends (i.e., the 2H mode position and the 4LO mode position) of the working range of shift motor 23 at which rotary motion of shift-motor output shaft 23a of shift motor 23 clockwise or counterclockwise is prevented and stopped mechanically. Regarding switching between two drive mode positions corresponding to both ends (i.e., the 2H mode position and the 4LO mode position) of the working range of shift motor 23, it is possible to switch from one of the 2H and 4LO modes to the other, irrespective of the presence or absence of the drive mode position information, under a condition that shift motor 23 is normal and operable. For instance, in presence of the driver's wishes that the vehicle approaches from dry pavements to bad roads, it is possible to switch the actual transfer shift position to the 4LO mode position by manually shifting drive mode selector switch 24 to the 4LO mode by the driver, even in presence of the drive mode position sensor failure.

[2H–4LO Drive Mode Switching Control]

After only the switching operation between two drive mode positions corresponding to both ends (i.e., the 2H mode position and the 4LO mode position) of the working range of shift motor 23 has been allowed through step S11, the drive mode switching control is executed in accordance with the flow chart of FIG. 8.

When the driver manually switches drive mode selector switch 24 from the 2H mode to the 4LO, or when the driver manually switches drive mode selector switch 24 from the 4LO mode to the 2H, the subroutine of FIG. 8 flows from step S21 through steps S22–S25 to step S26. A series of steps S24–S26 are repeatedly executed until the input interface of TFCU 26 receives the stop signal from drive mode position sensor 25. That is, during repeated executions of steps S24–S26, TFCU 26 continues to output a command signal (a drive signal) to shift motor 23.

Assuming that drive mode position sensor 25 is partially failed but the first shift actuator position switch SW1 of four shift actuator position switches SW1–SW4 of drive mode position sensor 25 is normal, as can be appreciated from the mode-selector shifting pattern versus ON/OFF signal change table of FIG. 6, it is possible to certainly detect or discriminate or determine that switching of drive mode selector switch 24 from the 4LO mode to the 2H mode occurs. Assuming that drive mode position sensor 25 is partially failed but the fourth shift actuator position switch SW4 of four shift actuator position switches SW1–SW4 of drive mode position sensor 25 is normal, as can be appreciated from the mode-selector shifting pattern versus ON/OFF signal change table of FIG. 6, it is possible to certainly detect or discriminate or determine that switching of drive mode selector switch 24 from the 2H mode to the 4LO mode occurs.

As discussed above, when drive mode position sensor 25 is partially failed but the first shift actuator position switch SW1 is normal during switching (4LO→2H) from 4LO to 2H, or when drive mode position sensor 25 is partially failed but the fourth shift actuator position switch SW4 is normal during switching (2H→4LO) from 2H to 4LO, drive mode position sensor 25 can generate the stop signal at step S26 before elapsed time $T_M$, measured from the time when shift motor 23 begins to rotate, exceeds predetermined time limit $T_L$. Thereafter, the subroutine proceeds from step S26 via step S27 to step S28. At step S27, shift motor 23 is stopped. At step S28, the previous value of the shift-motor rotational position detected and calculated one execution cycle before, already stored in the predetermined memory address of the RAM of TFCU 26, is updated by the current value of the shift-motor rotational position detected and calculated at the current execution cycle. In this manner, when drive mode position sensor 25 is partially failed but the first shift actuator position switch SW1 is normal during switching (4LO→2H) from 4LO to 2H, or when drive mode position sensor 25 is partially failed but the fourth shift actuator position switch SW4 is normal during switching (2H→4LO) from 2H to 4LO, shift motor 23 can be efficiently rotated for a brief moment, in other words, for a minimum time period shorter than predetermined time limit $T_L$.

On the contrary, assuming that drive mode position sensor 25 is fully failed, that is, four shift actuator position switches SW1–SW4 are all failed, or assuming that drive mode position sensor 25 is partially failed and the first shift actuator position switch SW1, related to the stop signal output during switching (4LO→2H) from 4LO to 2H, is failed in presence of switching (4LO→2H) from 4LO to 2H, or assuming that drive mode position sensor 25 is partially failed and the fourth shift actuator position switch SW4, related to the stop signal output during switching (2H→4LO) from 2H to 4LO, is failed in presence of switching (2H→4LO) from 2H to 4LO, the input interface of TFCU 26 cannot permanently receive the stop signal from drive mode position sensor 25. In such a case, elapsed time $T_M$, measured from the time when shift motor 23 begins to rotate, exceeds predetermined time limit $T_L$. Under the condition defined by $T_M > T_L$, the subroutine flows from step S25 to step S29. At step S29, the processor of TFCU 29 generates a command signal needed to stop shift motor 23. In this manner, when drive mode position sensor 25 is fully failed, that is, four shift actuator position switches SW1–SW4 are all failed, or when drive mode position sensor 25 is partially failed and the first shift actuator position switch SW1, related to the stop signal output during switching (4LO→2H) from 4LO to 2H, is failed in presence of switching (4LO→2H) from 4LO to 2H, or when drive mode position sensor 25 is partially failed and the fourth shift actuator position switch SW4, related to the stop signal output during switching (2H→4LO) from 2H to 4LO, is failed in presence of switching (2H→4LO) from 2H to 4LO, shift motor 23 can be stopped after shift motor 23 has been rotated for the predetermined time limit $T_L$.

As explained above, according to the system of the embodiment, when drive mode position sensor 25 is fully failed, that is, four shift actuator position switches SW1–SW4 are all failed, or when drive mode position sensor 25 is partially failed and the first shift actuator position switch SW1, related to the stop signal output during switching (4LO→2H) from 4LO to 2H, is failed in presence of switching (4LO→2H) from 4LO to 2H, or when drive mode position sensor 25 is partially failed and the fourth shift actuator position switch SW4, related to the stop signal output during switching (2H→4LO) from 2H to 4LO, is failed in presence of switching (2H→4LO) from 2H to 4LO, it is possible to achieve switching between the 2H and 4LO modes by rotating shift motor 23 for the predetermined time limit $T_L$. Additionally, when drive mode position sensor 25 is partially failed but the first shift actuator position switch SW1 is normal during switching (4LO→2H) from 4LO to 2H, or when drive mode position sensor 25 is partially failed but the fourth shift actuator position switch SW4 is normal during switching (2H→4LO) from 2H to 4LO, it is possible to achieve switching between the 2H and 4LO modes by rotating shift motor 23 for the minimum time period shorter than predetermined time limit $T_L$, in the same manner as the normal period of the drive mode switching control system.

During the switching period from the two-wheel-drive high (2H) mode position to the four-wheel-drive low (4LO) mode position, as can be appreciated from the development of cylindrical cam 48 shown in FIG. 3, rotary motion of cylindrical cam 48 in one rotation direction brings first pin 21i of the gearshift device of high/low switching mechanism 21 into abutment with circular-arc shaped low-gear side cam groove end 48a' of high/low cam groove 48a, and as a result switching of the transfer shift position to the 4LO mode position is achieved. In contrast, during the switching period from the four-wheel-drive low (4LO) mode position to the two-wheel-drive high (2H) mode position, as can be appreciated from the development of cylindrical cam 48 shown in FIG. 3, rotary motion of cylindrical cam 48 in the other rotation direction brings second pin 22f of 2WD–4WD switching mechanism 22 into abutment with circular-arc shaped 2WD side cam groove end 48b' of 2WD–4WD cam groove 48b, and as a result switching of the transfer shift position to the 2H mode position is attained.

The transfer drive mode switching control system of the embodiment provides the following effects.

(1) In transfer 4 employing drive mode position sensor 25 (drive mode position detection means) capable of detecting a drive mode position of transfer 4 and generating information regarding the drive mode position, and transfer control unit 26 that outputs a control command signal based on the drive mode position information from drive mode position sensor 25 to a shift actuator (shift motor 23) and controls switching between a plurality of drive mode positions of transfer 4 responsively to a driver-selected drive mode, transfer control unit 26 (drive mode switching control means) allows only a switching operation between predetermined two different drive mode positions (e.g., a two-wheel-drive high (2H) mode position and a four-wheel-drive low (4LO) mode position) corresponding to both ends of a working range of the shift actuator at which motion of the shift actuator is prevented and stopped mechanically, in presence of a failure in drive mode position sensor 25. Therefore, even if there is a failure in detection of the drive mode position, it is possible to prevent an automotive vehicle from being conditioned in an undrivable state. Additionally, even when drive mode position sensor 25 is failed, the transfer drive mode switching control system of the embodiment can respond to a driver's drive mode switching requirement (a driver's mode selection), although the driver's drive mode switching requirement is limited to switching between the predetermined two drive mode positions (e.g., 2H and 4LO mode positions).

(2) Transfer control unit 26 makes a check for a predetermined interlock condition when switching to the driver-selected drive mode (or in presence of a driver's mode selection from one of the drive modes to the other), and thereafter operates the shift actuator when the interlock condition is satisfied. The processor of TFCU 26 determines that the transfer drive mode switching control system is partially failed, when the drive mode position information from drive mode position sensor 25, indicating that the driver-selected drive mode has been reached, is absent during a time period from a time when the shift actuator begins to operate when switching to the driver-selected drive mode to a time when an elapsed time ($T_M$), measured from the time when the shift actuator begins to operate, exceeds a predetermined time limit ($T_L$). That is, transfer control unit 26 includes a partially failed transfer drive mode switching control system condition diagnostic step S4 that diagnoses or determines that the transfer drive mode switching control system is partially failed and there is a possibility of a failure in drive mode position sensor 25 or there is a possibility of a failure in the shift actuator (shift motor 23), when the predetermined condition defined by $T_M > T_L$ is satisfied. Therefore, during the drive mode switching control, it is possible to easily make a diagnosis on partially failed transfer drive mode switching control system conditions, such as the presence or absence of a failure in drive mode position sensor 25 or the presence or absence of a failure in the shift actuator, while reliably protecting the shift actuator (shift motor 23).

(3) Transfer control unit 26 includes an actuator-and-sensor failure diagnostic step (S8–S10) that stops the shift actuator (shift motor 23) when the partially failed transfer drive mode switching control system condition diagnostic step S4 determines that the transfer drive mode switching control system is partially failed and there is a possibility of a failure in drive mode position sensor 25 or there is a possibility of a failure in the shift actuator. Additionally, the actuator-and-sensor failure diagnostic step (S8–S10) compares a previous shift-actuator position calculated one control cycle before with a current shift-actuator position obtained after the shift actuator has been stopped. Additionally, the actuator-and-sensor failure diagnostic step (S8–S10) diagnoses, based on a result of comparison between the previous shift-actuator position and the current shift-actuator position, whether the shift actuator is failed or drive mode position sensor 25 is failed. The actuator-and-sensor failure diagnostic step (S8–S10) determines that the shift actuator (shift motor 23) is failed and inoperable when the previous shift-actuator position and the current shift-actuator position are identical to each other, and determines that drive mode position sensor 25 is failed when the previous shift-actuator position and the current shift-actuator position are different from each other. Transfer control unit 26 also includes a drive mode position detection means failure countermeasure step (or a drive mode position sensor failure countermeasure step) (S11; S21–S29) that allows only the switching operation between the predetermined two drive modes (e.g., 2H and 4LO modes), when the transfer drive mode switching control system is partially failed, for example, owing to a failure in drive mode position sensor 25, and in absence of a failure in the shift actuator (that is, when the shift actuator (shift motor 23) is normal and operable). On the basis of such a high-precision drive mode position sensor failure diagnosis, the transfer drive mode switching control system of the embodiment can initiate a fail-safe operating mode in which the system allows only the switching operation between the predetermined two drive modes (e.g., 2H and 4LO modes) corresponding to both ends of the working range of the shift actuator at which motion of the shift actuator is prevented and stopped mechanically.

(4) The drive mode position detection means failure countermeasure step (the drive mode position sensor failure countermeasure step) S21–S29 of transfer control unit 26 checks a predetermined interlock condition (see step S23 of FIG. 8) when drive mode position sensor 25 is failed and additionally in presence of a driver's mode selection from one of the predetermined two drive modes (e.g., 2H and 4LO modes) to the other, and thereafter re-operates the shift actuator (see step S24) responsively to a driver-selected drive mode when the interlock condition is satisfied. As soon as drive mode position sensor 25 generates the drive mode position information indicating that the driver-selected drive mode has been reached before (i.e., $T_M \leq T_L$) elapsed time $T_M$, measured from the time when the shift actuator begins to operate, exceeds predetermined time limit. $T_L$, the shift actuator (shift motor 23) is stopped at once (see step S27). Conversely when there is no output of drive mode position information from drive mode position sensor 25, indicating that the driver-selected drive mode position has been reached, in spite of expiration of predetermined time limit (i.e., $T_M > T_L$), the shift actuator is stopped (see step S29) at a time point when elapsed time $T_M$ exceeds predetermined time limit $T_L$. After the shift actuator has been stopped at step S29, the drive mode position is updated (see step S28). Thus, under a partially-failed drive mode position sensor condition that a certain shift actuator position switch (SW1; SW4) of a plurality of shift actuator position switches SW1–SW4 constructing drive mode position sensor 25, related to the output of drive mode position information indicating that the driver-selected drive mode position has been reached, is normal, it is possible to achieve switching between the predetermined two drive modes (e.g., 2H and 4LO modes) by rotating shift motor 23 for the minimum time period shorter than predetermined time limit $T_L$, in the same manner as the normally operating drive mode switching control system.

(5) A neutral (N) mode position, a two-wheel-drive high (2H) mode position, a four-wheel-drive high (4H) mode position, and a four-wheel-drive low (4LO) mode position are transfer shift positions of transfer 4. Transfer 4 includes high/low switching mechanism 21 capable of switching from one of three drive mode positions, that is, a two-wheel-drive high (2H) mode position, a four-wheel-drive high (4H) mode position, and a four-wheel-drive low (4LO) mode position, to the other, and 2WD–4WD switching mechanism 22 capable of switching between 2WD and 4WD operating modes. Transfer control unit 26 allows only a switching operation between the 2H and 4LO mode positions corresponding to both ends of the working range of the shift actuator at which motion of the shift actuator is prevented and stopped mechanically, in presence of a failure in drive mode position sensor 25. Therefore, even if there is a failure in detection of the drive mode position, the system of the embodiment can avoid transfer 4 from being stopped at the N mode position and thus prevent the vehicle from being conditioned in an undrivable state. Additionally, even when drive mode position sensor 25 is failed, the system of the embodiment can respond to a driver's drive mode switching requirement (a driver's mode selection), although the driver's drive mode switching requirement is limited to switching between the 2H and 4LO mode positions corresponding to both ends of the working range of the shift actuator.

(6) The shift actuator is comprised of shift motor 23 serving as a sole actuator, which is common to both of the high/low switching mechanism 21 and 2WD–4WD switching mechanism 22 for driving high/low switching mechanism 21 and 2WD–4WD switching mechanism 22. Drive mode position sensor 25 is attached to the shift-motor output shaft 23a of shift motor 23. Drive mode position sensor 25 is constructed by four shift actuator position switches SW1, SW2, SW3, and SW4, which are operable within a set rotational range. The drive mode position is discriminated or identified by a combination of switch signals from the shift actuator position switches SW1–SW4 operable within the set rotational range. Transfer 4 further includes cylindrical cam 48 having (i) high-gear and low-gear cam groove 48a that engages first pin 21i of high/low switching mechanism 21 and (ii) 2WD–4WD cam groove 48b that engages second pin 22f of 2WD–4WD switching mechanism 22, and mechanically linked to shift-motor output shaft 23a of shift motor 23. High-gear and low-gear cam groove 48a and 2WD–4WD cam groove 48b are formed on the cylindrical outer periphery of cylindrical cam 48. When switching from the 2H mode position to the 4LO mode position under the condition that only the switching operation between the 2H and 4LO mode positions is allowed in presence of the failure in drive mode position sensor 25, first pin 21i of high/low switching mechanism 21 is brought into abutment with low-gear side cam groove end 48a' of high/low cam groove 48a by rotary motion of cylindrical cam 48 in one rotation direction, and thus stopped by abutment between low-gear side cam groove end 48a' and first pin 21i. In this manner, the transfer shift position can be switched to the 4LO mode position. Conversely when switching from the 4LO mode position to the 2H mode position under the condition that only the switching operation between the 2H and 4LO mode positions is allowed in presence of the failure in drive mode position sensor 25, second pin 22f of 2WD–4WD switching mechanism 22 is brought into abutment with 2WD side cam groove end 48b' of 2WD–4WD cam groove 48b by rotary motion of cylindrical cam 48 in the other rotation direction, and thus stopped by abutment between 2WD side cam groove end 48b' and second pin 22f. In this manner, the transfer shift position can be switched to the 2H mode position. Therefore, in presence of the failure in drive mode position sensor 25, it is possible to certainly achieve switching between the 2H and 4LO mode positions by mechanically preventing or inhibiting rotary motion of cylindrical cam 48, caused by shift motor 23, by way of abutment between the pin (21i; 22f) and the cam groove end (48a'; 48b').

In the shown embodiment, the transfer device having a N mode position and employing high/low switching mechanism 21 capable of switching from one of three drive mode positions, namely, the 2H, 4H, and 4LO mode positions, to the other, and 2WD–4WD switching mechanism 22 capable of switching between 2WD and 4WD operating modes. It will be appreciated that the fundamental concept of the invention may be applied to a transfer device having a N mode position and employing a high/low switching mechanism capable of switching from one of a plurality of drive mode positions, such as four or more drive mode positions, to the other, and a 2WD–4WD switching mechanism. In this case, it is possible to certainly realize switching between a first drive mode position of the drive mode positions and the second drive mode position by allowing only the switching operation between the first and second drive mode positions corresponding to both ends of a working range of a shift actuator at which motion of the shift actuator is prevented and stopped mechanically, even in presence of a failure in drive mode position detection means (in presence of the drive mode position sensor system failure).

In the system of the embodiment, high/low switching mechanism 21 and 2WD–4WD switching mechanism 22 of the transfer device are both driven by means of the sole shift actuator (shift motor 23) common to both the two switching mechanisms. In lieu thereof, high/low switching mechanism 21 and 2WD–4WD switching mechanism 22 may be driven independently of each other by means of two actuators having a driving connection with the respective switching mechanisms. In the shown embodiment, an electric motor is used as the shift actuator. Alternatively, a hydraulic actuator or an air-pressure actuator such as a pneumatic motor may be used as the shift actuator.

In the shown embodiment, exemplified as the drive mode position detection means is the drive mode position sensor 25 attached to the shift-motor output shaft 23a of shift motor 23 and constructed by four shift actuator-position switches SW1–SW4, which are operable within the set rotational range and provided to discriminate the drive mode position by a combination of switch signals from the shift actuator position switches SW1–SW4. Another type of mode position detector, capable of detecting the operating position of the shift actuator (shift motor 23), the operating position of high/low switching mechanism 21 and the operating position of 2WD–4WD switching mechanism 22, may be used as the drive mode position detection means.

The entire contents of Japanese Patent Application No. 2003-116490 (filed Apr. 22, 2003) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A transfer drive mode switching control system comprising:
   a shift actuator that switches from one of a plurality of drive mode positions of a transfer to the other;
   a drive mode position sensor that detects the drive mode position switched by the shift actuator and generates information regarding the drive mode position;
   a transfer control unit configured to be electrically connected to the drive mode position sensor and the shift actuator for outputting a control command signal based on the drive mode position information to the shift actuator and for controlling switching between the drive mode positions responsively to a driver-selected drive mode; and
   the transfer control unit allowing only a switching operation between predetermined two different drive mode positions corresponding to both ends of a working range of the shift actuator at which motion of the shift actuator is stopped mechanically, in presence of a failure in the drive mode position sensor.

2. The transfer drive mode switching control system as claimed in claim 1, wherein:
   the transfer control unit comprises a partially failed transfer drive mode switching control system condition diagnostic section determining that the transfer drive mode switching control system is partially failed, when the drive mode position information from the drive mode position sensor, indicating that the driver-selected drive mode has been reached, is absent during a time period from a time when the shift actuator begins to operate when switching to the driver-selected drive mode to a time when an elapsed time, measured from the time when the shift actuator begins to operate, exceeds a predetermined time limit.

3. The transfer drive mode switching control system as claimed in claim 2, wherein:
   the transfer control unit comprises:
   (a) an actuator-and-sensor failure diagnostic section that stops the shift actuator when the partially failed transfer drive mode switching control system condition diagnostic section determines that the transfer drive mode switching control system is partially failed, and additionally compares a previous shift-actuator position of the shift actuator calculated one control cycle before with a current shift-actuator position obtained after the shift actuator has been stopped, and additionally diagnoses, based on a result of comparison between the previous shift-actuator position and the current shift-actuator position, whether the shift actuator is failed or the drive mode position sensor is failed; the actuator-and-sensor failure diagnostic section determining that the shift actuator is failed and inoperable when the previous shift-actuator position and the current shift-actuator position are identical to each other, and determining that the drive mode position sensor is failed when the previous shift-actuator position and the current shift-actuator position are different from each other; and (b) a drive mode position sensor failure countermeasure section that allows only the switching operation between the predetermined two drive modes, when the partially failed transfer drive mode switching control system condition diagnostic section determines that the transfer drive mode switching control system is partially failed and the actuator-and-sensor failure diagnostic section determines that the shift actuator is normal and operable.

4. The transfer drive mode switching control system as claimed in claim 3, wherein:

the drive mode position sensor failure countermeasure section re-operates the shift actuator responsively to the driver-selected drive mode when the actuator-and-sensor failure diagnostic section determines that the drive mode position sensor is failed and additionally in presence of a driver's mode selection from one of the predetermined two drive modes to the other, and wherein, immediately when the drive mode position sensor generates the drive mode position information indicating that the driver-selected drive mode has been reached, the drive mode position sensor failure countermeasure section stops the shift actuator, and conversely when the drive mode position information from the drive mode position sensor, indicating that the driver-selected drive mode has been reached, is absent during a time period from a time when the shift actuator begins to operate when switching to the driver-selected drive mode to a time when an elapsed time, measured from the time when the shift actuator begins to operate, exceeds a predetermined time limit, the drive mode position sensor failure countermeasure section stops the shift actuator upon expiration of the predetermined time limit, and wherein the drive mode position sensor failure countermeasure section updates the drive mode position after the shift actuator has been stopped.

5. The transfer drive mode switching control system as claimed in claim 1, wherein:

shift positions of the transfer are a neutral mode position, a two-wheel-drive high (2H) mode position, a four-wheel-drive high (4H) mode position, and a four-wheel-drive low (4LO) mode position;

the transfer comprises a high-gear and low-gear switching mechanism capable of switching from one of the 2H mode position, the 4H mode position, and the 4LO mode position to the other, and a 2WD-4WD switching mechanism capable of switching between a two-wheel-drive operating mode and a four-wheel-drive operating mode; and the transfer control unit allows only a switching operation between the 2H and 4LO mode positions corresponding to both ends of the working range of the shift actuator at which motion of the shift actuator is stopped mechanically, in presence of the failure in the drive mode position sensor.

6. The transfer drive mode switching control system as claimed in claim 5, wherein:

the shift actuator comprises a sole shift motor, which is common to both of the high-gear and low-gear switching mechanism and the 2WD-4WD switching mechanism for driving the high-gear and low-gear switching mechanism and the 2WD-4WD switching mechanism;

the drive mode position sensor is attached to a shift-motor output shaft of the shift motor;

the drive mode position sensor comprises four shift actuator position switches, which are operable within a set rotational range and provided for discriminating the drive mode position by a combination of switch signals from the shift actuator position switches;

the high-gear and low-gear switching mechanism comprises a first pin;

the 2WD-4WD switching mechanism comprises a second pin;

the transfer further comprises a cylindrical cam having (i) a first cam groove that engages the first pin of the high-gear and low-gear switching mechanism and (ii) a second cam groove that engages the second pin of the 2WD-4WD switching mechanism, and mechanically linked to the shift-motor output shaft; the first and second cam grooves being formed on a cylindrical outer periphery of the cylindrical cam;

when switching from the 2H mode position to the 4LO mode position under a condition that only the switching operation between the 2H and 4LO mode positions is allowed in presence of the failure in the drive mode position sensor, the first pin of the high-gear and low-gear switching mechanism is brought into abutment with a low-gear side cam groove end of the first cam groove by rotary motion of the cylindrical cam in one rotation direction, and thus stopped by abutment between the low-gear side cam groove end and the first pin to achieve switching the 4LO mode position; and conversely when switching from the 4LO mode position to the 2H mode position under the condition that only the switching operation between the 2H and 4LO mode positions is allowed in presence of the failure in the drive mode position sensor, the second pin of the 2WD-4WD switching mechanism is brought into abutment with a 2WD side cam groove end of the second cam groove by rotary motion of the cylindrical cam in the other rotation direction, and thus stopped by abutment between the 2WD side cam groove end and the second pin to achieve switching the 2H mode position.

7. The transfer drive mode switching control system as claimed in claim 2, wherein:

the shift actuator is operated responsively to the driver-selected drive mode only when a predetermined interlock condition is satisfied; the predetermined interlock condition being a drive mode switching enabling condition under which a drive mode switching operation of the transfer drive mode switching control system is enabled.

8. The transfer drive mode switching control system as claimed in claim 4, wherein:
the shift actuator is operated responsively to the driver-selected drive mode only when a predetermined interlock condition is satisfied; the predetermined interlock condition being a drive mode switching enabling condition under which a drive mode switching operation of the transfer drive mode switching control system is enabled.

9. A transfer drive mode switching control system comprising:
a shift actuator for switching from one of a plurality of drive mode positions of a transfer to the other;
drive mode position detection means for detecting the drive mode position switched by the shift actuator and for generating information regarding the drive mode position;
drive mode switching control means configured to be electrically connected to the drive mode position detection means and the shift actuator for outputting a control command signal based on the drive mode position information to the shift actuator and for controlling switching between the drive mode positions responsively to a driver-selected drive mode; and
the drive mode switching control means allowing only a switching operation between predetermined two different drive mode positions corresponding to both ends of a working range of the shift actuator at which motion of the shift actuator is stopped mechanically, in presence of a failure in the drive mode position detection means.

10. A method for controlling switching from one of a plurality of drive mode positions of a transfer to the other via a shift actuator responsively to a driver-selected drive mode, the method comprising:
detecting the drive mode position switched by the shift actuator by a drive mode position sensor and generating information regarding the drive mode position; and
allowing only a switching operation between predetermined two different drive mode positions corresponding to both ends of a working range of the shift actuator at which motion of the shift actuator is stopped mechanically, in presence of a failure in the drive mode position sensor of a transfer drive mode switching control system.

11. The method as claimed in claim 10, further comprising:
determining that the transfer drive mode switching control system is partially failed, when the drive mode position information from the drive mode position sensor, indicating that the driver-selected drive mode has been reached, is absent during a time period from a time when the shift actuator begins to operate when switching to the driver-selected drive mode to a time when an elapsed time, measured from the time when the shift actuator begins to operate, exceeds a predetermined time limit;
stopping the shift actuator when the transfer drive mode switching control system is partially failed;
comparing a previous shift-actuator position of the shift actuator calculated one control cycle before with a current shift-actuator position obtained after the shift actuator has been stopped;
diagnosing, based on a result of comparison between the previous shift-actuator position and the current shift-actuator position, whether the shift actuator is failed or the drive mode position sensor is failed;
determining that the shift actuator is failed and inoperable when the previous shift-actuator position and the current shift-actuator position are identical to each other;
determining that the drive mode position sensor is failed when the previous shift-actuator position and the current shift-actuator position are different from each other; and
allowing only the switching operation between the predetermined two drive modes, when the transfer drive mode switching control system is partially failed and the shift actuator is normal and operable.

12. The method as claimed in claim 11, further comprising:
re-operating the shift actuator responsively to a driver-selected drive mode when the drive mode position sensor is failed and additionally in presence of a driver's mode selection from one of the predetermined two drive modes to the other;
stopping the shift actuator, immediately when the drive mode position sensor generates the drive mode position information indicating that the driver-selected drive mode has been reached;
stopping the shift actuator upon expiration of the predetermined time limit, conversely when the drive mode position information from the drive mode position sensor, indicating that the driver-selected drive mode has been reached, is absent during the time period from the time when the shift actuator begins to operate to the time when the elapsed time, measured from the time when the shift actuator begins to operate, exceeds the predetermined time limit; and
updating the drive mode position after the shift actuator has been stopped.

* * * * *